United States Patent [19]

Young et al.

[11] 4,176,932

[45] Dec. 4, 1979

[54] PHOTOGRAPHIC LIGHTING UNIT

[75] Inventors: Warren H. Young, Marshfield; Nolan A. Drevitch, South Easton; Anthony G. Rosati, Salem, all of Mass.

[73] Assignee: Polaroid Corporation, Cambridge, Mass.

[21] Appl. No.: 847,534

[22] Filed: Nov. 1, 1977

[51] Int. Cl.$^2$ .................... G03B 15/02; G03B 15/03; G03B 17/02
[52] U.S. Cl. .................... 354/126; 354/132; 354/288; 362/11
[58] Field of Search ............ 354/126, 132, 288, 295; 362/3, 11

[56] References Cited

U.S. PATENT DOCUMENTS

| | | | |
|---|---|---|---|
| 2,261,953 | 11/1941 | Brown | 354/132 |
| 2,682,816 | 7/1954 | Walden | 354/132 |
| 2,851,936 | 9/1958 | Seiden | 354/132 |
| 3,213,774 | 10/1965 | Curtiss | 354/126 |
| 3,747,488 | 7/1973 | Bennett | 354/126 |

FOREIGN PATENT DOCUMENTS

789397  7/1968  Canada ........................ 362/3

*Primary Examiner*—L. T. Hix
*Assistant Examiner*—Thomas H. Tarcza
*Attorney, Agent, or Firm*—Frederick A. Goettel, Jr.

[57] ABSTRACT

A compact photographic lighting apparatus for use with a motion picture camera comprising a pair of high intensity lamp-reflector assemblies mounted in side-by-side relation to opposite sides of a central main body support. The main body support is adapted to mate with complementary structure provided on the movie camera with which it is used. Each of the lamp assemblies includes a mounting cone having outwardly extending rib-like structural elements and further including outwardly extending cage-like guard assembly having a lens element at its outermost end. A thumb screw extending vertically through the main body support serves to removably attach the overall assembly to the camera. Electrical connector pins, also received in the camera extend downward rearwardly of the thumb screw and a downwardly extending positioning element, also received in the camera, is positioned forwardly of the thumb screw.

14 Claims, 6 Drawing Figures

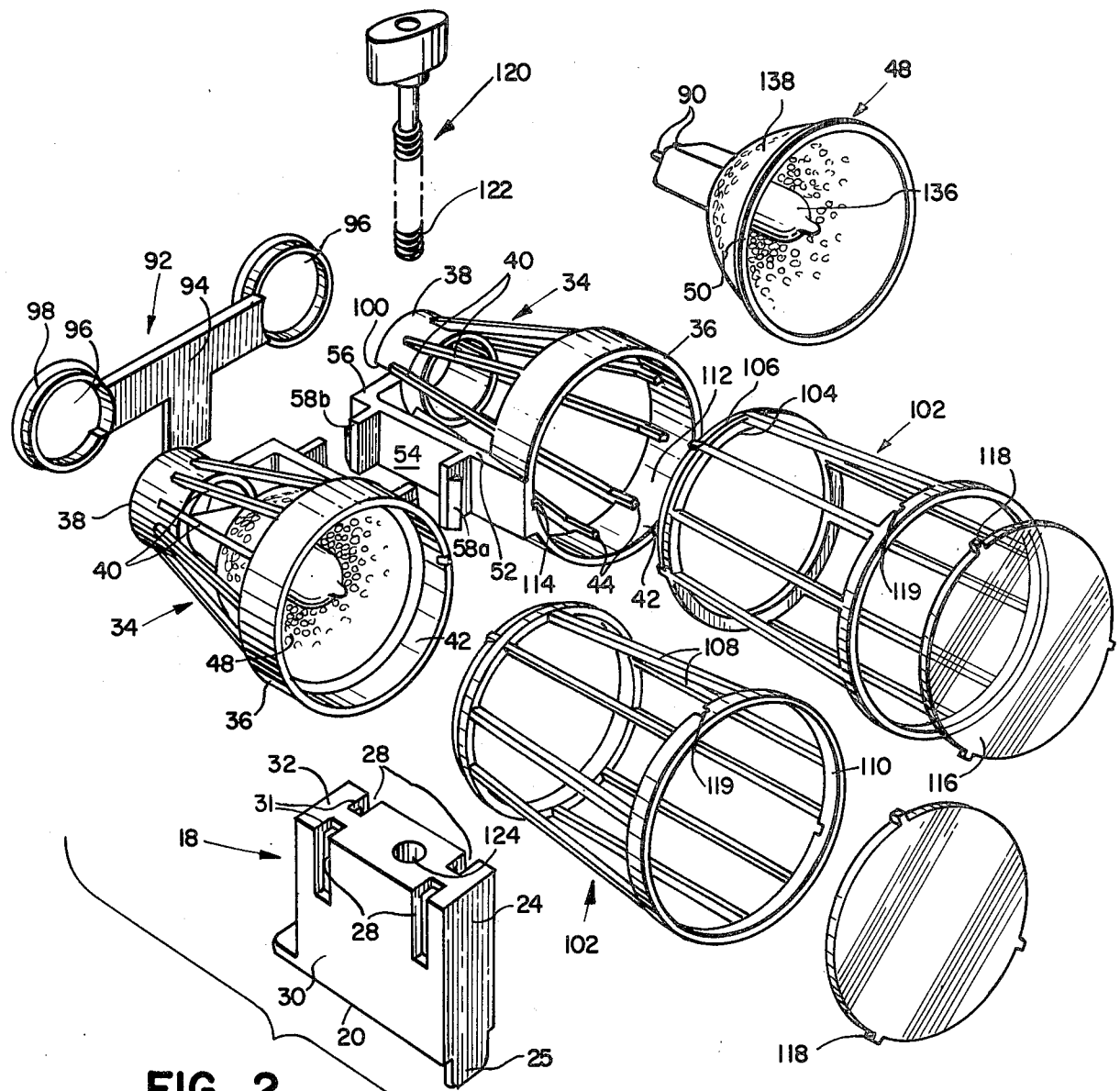
FIG. 2
FIG. 5
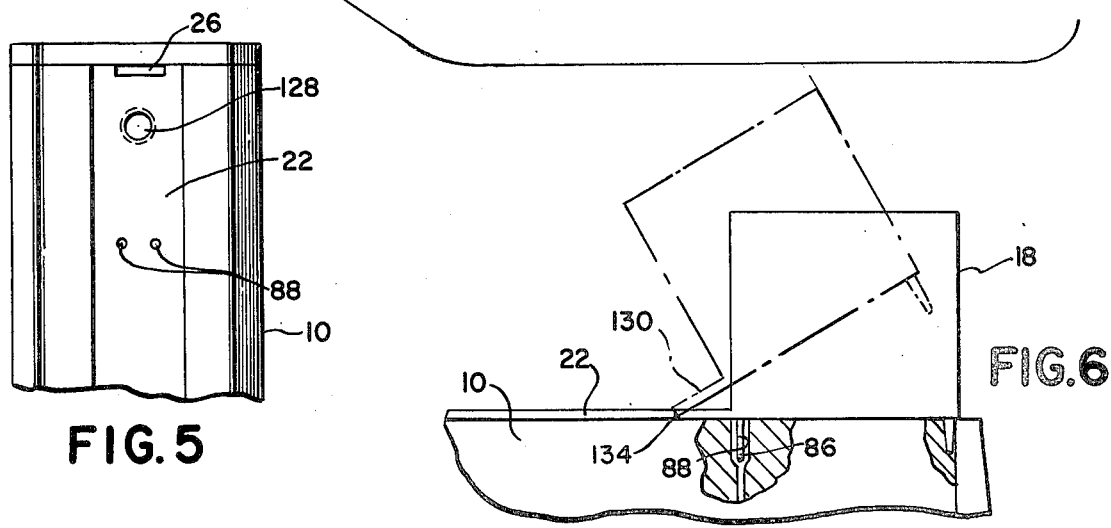
FIG.6

PHOTOGRAPHIC LIGHTING UNIT

BACKGROUND OF THE INVENTION

1. Field of the Invention

This invention relates to photographic lighting apparatus and, more particularly, to a portable photographic lighting unit for illumination of a subject during photographic exposure operations.

2. Description of the Prior Art

The high level of scene illumination necessary for motion picture photographic exposure operations typically has resulted in a fairly large size, relatively cumbersome lighting unit for use in providing such necessary illumination. Also, such units have often been required to be supported independently of the camera by means of a stand, another person, or, requiring the person taking the motion pictures to hold the lighting unit in his other hand.

Another drawback of typical prior art motion picture lighting units has been the high temperature which the illuminating lamps and the surrounding supporting structure rise to when the movie lamp has been used for an extended period of time to illuminate a desired scene.

SUMMARY OF THE INVENTION

The present invention provides photographic lighting apparatus for use with a motion picture camera for illumination of a scene during exposure operations and comprises a pair of high intensity illuminating lamps mounted in tandem on opposite sides of a central support member or block which is adapted to mate with complementary structure provided in the top surface of a suitable motion picture camera. Each of the high intensity lamp assemblies includes a mounting cone adapted to efficiently dissipate heat from the lamp assembly and also includes an outwardly extending cage-like guard assembly having a lens at its outer end which together serve to efficiently dissipate heat generated by the high intensity lamps as well as permitting good transmission of light from the lamp reflector elements for illumination of the photographic scene.

Preferably, the lighting unit includes a main body support which is adapted to attach to complementary structure on the camera and which presents a rearwardly facing wall portion which is provided with a plurality of recesses or tracks which are adapted to receive suitable electrical connector elements which are arranged to extend below the base portion for electrical contact with suitable terminals in the camera and which extend through the rear portion of the main support member and outwardly from opposing sides thereof in a manner to contact the terminals of the high intensity lamp assemblies, which are mounted in their supporting structures, to the opposing sides of the center support block to thereby electrically interconnect the pair of high intensity lamps in a series connection. A substantially T-shaped end cap piece is provided to cover the electrical connectors disposed in the rear wall of the center support member and also to extend outwardly thereof to suitably protect the connections of the electrical connectors to the terminals of the pair of high intensity lamp assemblies.

BRIEF DESCRIPTION OF THE DRAWINGS

The novel features that are considered characteristic of the invention are set forth with particularity in the appended claims. The invention, however, will be best understood from the following description of the preferred embodiment when read in connection with the accompanying drawings wherein like numbers have been employed in the different figures to denote the same parts and wherein:

FIG. 2 is an exploded view in perspective of the lighting unit shown in FIG. 1;

FIG. 5 is a fragmentary plan view of the front end of the camera showing the lamp assembly receiving structure thereof; and FIG. 6 is a simplified side elevational view of a portion of the camera showing the central support block in its operative position and also illustrating the motion of the support block where it inadvertently tipped rearwardly.

DESCRIPTION OF THE PREFERRED EMBODIMENT

Figure 1:
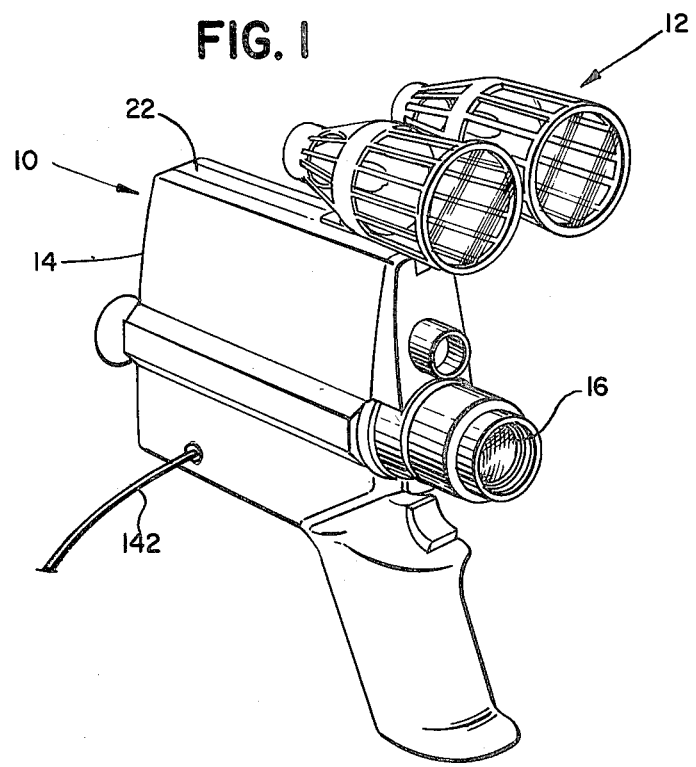
FIG. 1 is a diagrammatic view in perspective of photographic apparatus employing a lighting unit embodying features of this invention.

In FIG. 1, a conventional motion picture camera 10 is shown in association with a lighting unit 12. The camera 10 comprises a substantially light-tight housing 14 having a forwardly positioned objective lens system 16 adapted for exposure of a motion picture film when it is positioned within the housing at an exposure aperture as is conventional. The lighting unit 12 as shown more clearly in FIGS. 2, 3 and 4 comprises a hollow, substantially rectangular main body support structure 18 having an open bottom 19 defining a downwardly facing base perimeter portion 20 which is adapted to seat firmly upon the upper surface 22 of camera 10 when in operative engagement therewith. As best seen in FIG. 4, the main body also has a hollow cylinder 21, integrally formed therewith, defining a circular opening 23 that passes from the upper surface through the open bottom. The forwardly facing wall portion 24 of the main body 18 includes a downwardly extending substantially rectangular projection 25 which is adapted to facilitate proper orientation and mounting of the complete lighting assembly upon a suitable camera by mating with a complementary slot 26 provided in the upper lamp assembly receiving surface 22 of the camera 10.

As best seen in FIG. 2, the hollow main body 18 is provided with a pair of vertically extending elongated slots 28 in each of its vertically extending substantially flat sides 30. Each of the slots 28 extends through the wall portion of the body into the hollow interior thereof. Further, each slot 28 is open at its upper end to form a substantially open ended rectangular opening 31 in the upper surface 32 of the main body. These openings are configured to receive complementary structure provided on a pair of lamp receiving and positioning cup members 34 which will now be described in detail.

Each of the lamp receiving and positioning cup members 34, hereinafter referred to as lamp receiving members 34, comprises a first large outer annular ring portion 36 which is joined to a smaller rearwardly disposed annular member 38 by a plurality of thin rib elements 40 which extend from the interior surface 42 of the larger annular member 36 and converge rearwardly and terminate at a point where they are attached to the outer surface 44 of the smaller rearwardly disposed annular element 38. As shown in the right side lamp receiving member in FIG. 2, the ends of the plurality of rib members 40 terminate intermediate the front and the rear edges of the large annular member 36 to each define a forwardly facing surface 44. These surfaces, in turn, cooperate together to define a lamp-reflector assembly support surface when the lamp-reflector assembly 48 is inserted into the lamp receiving member 34. Referring to the lamp reflector assembly 48 shown removed from its lamp receiving member in FIG. 2, it will be evident that the lamp reflector assembly 48 has an outer peripherally extending lip portion 50 which is adapted to rest upon the receiving and supporting surfaces 44 defined by the end portions of the rib members 40 to accordingly support the lamp reflector assembly in the position illustrated in the unit on the left hand side of the lighting assembly 12 illustrated in FIG. 2.

Again, as best seen in FIG. 2, each of the lamp receiving members 34 is provided with a main body support member 52 defining a mounting surface 54 which originates at the front of the lamp receiving member overlapping a portion of the first annular member 36 and extending rearwardly to a point where it intersects and is integrally formed with an additional support member 56 extending from the rearwardly disposed annular member to thereby rigidly support the mounting surface in a position substantially parallel to the sides of the main body support 18. Each of the lamp receiving member's mounting surfaces 54 is provided with a pair of outwardly extending projections 58A and 58B defining the complementary structure mentioned hereinabove which facilitates a snap fit attachment of each of the lamp receiving members 34 into the pair of vertically extending slots 28 provided in the opposite sides 30 of the main body support member 18. More specifically, the forwardmost projection 58A on each of the lamp receiving members has a substantially flat surface 60 which is in substantial alignment with the forwardmost, i.e., rearwardly facing surfaces 62 of the forwardmost slot 28 provided in the main body support member 18. Similarly, the rearwardly disposed projection 58B on the lamp receiving member is provided with a rearwardly facing surface 64 which is in substantial alignment with the rearmost, i.e., forwardly facing surface 66 of its complementary slot 28 in the main body support member. Each of the above-mentioned forward facing surfaces 60 and rearward facing surfaces 62 of the projections 58A,B carried by the lamp receiving member 34 is additionally provided with a forward facing 68 and rearward facing 70, respectively, ramped or camming portion which originates at the outermost end of the projection and extends towards the main body support mating surface 54 of the lamp receiving member 34, each terminating in a surface 72 substantially parallel to the main body support mating surface and facing said support surface. Accordingly, the structure described above permits a snap fit of the lamp receiving members 34 into the elongated slots 28 provided in the main body support 18, such as achieved by physically forcing the projections 58A,B of the lamp receiving member 34 into their respective slots 28 in the main body support 18 whereupon the projections 58A,B, facilitated by the camming surfaces 68, 70, will deflect inwardly permitting the projections to pass into their respective slots. The wall thickness of the main body support member 18 is such that following passage of the above-described camming or ramped elements 68, 70 a sufficient distance into the slotted openings 28, the camming surfaces will extend beyond the wall thickness of the main body 18 and snap into interlocking contact with the inner surface 74 of the main body support 18 thereby positively retaining the lamp receiving members 34 to the main body support.

In the preferred method of assembly of the movie light of the present invention, the first steps are to snap the pair of lamp receiving members 34 into their respective mounting slots in the main body member 18 as described hereinabove. Following this, the two lamp-reflector assemblies 48 are inserted within their respective lamp receiving member 34 and the unit is then positioned with the large annular members 36 facing downwardly in a suitable jig or the like which will support the lamp-reflector assemblies 48 against the support surface 46 defined by the ends of the rib members 40. Looking now at FIG. 3, it will be noted that the back side 72 of the main body member 18 and the back sides 76 of the pair of lamp receiving members 34 define a substantially T-shaped surface lying in a common plane and are provided with a plurality of electrical conductor receiving channels. Specifically, a first conductor channel 78 extends horizontally across the upper end of the T-shaped surface and is of sufficient depth to receive a first elongated electrical connector 80 which extends the full width of the channel and into a position overlying the ends of each of the lamp-reflector assemblies 48. A pair of electrical connectors 82 are similarly received in right angle channels 84 provided in the T-shaped surface, each of which respectively extends above and in overlapping relationship with one of the lamp reflector assemblies 48. The other end of each of the right angled electrical connectors 82 extends in its respective channel downwardly and below the lower surface 20 of the main body member 18 to define the pair of electrical connector pins 86 which are adapted to be received in mating electrical receptacles 88 provided in the motion picture camera 10.

Figure 3:
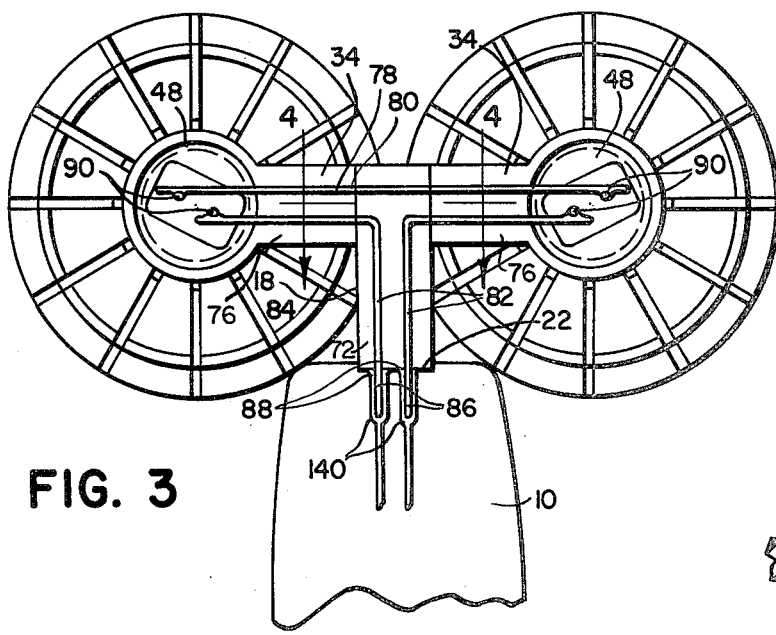
FIG. 3 is a back side elevational view of the lighting unit and camera with the end cap removed.
Figure 4:
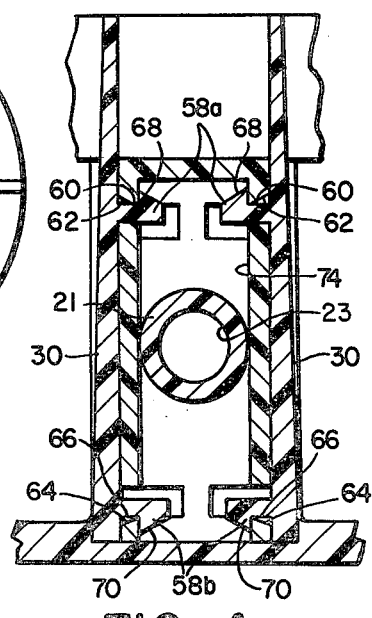
FIG. 4 is a sectional view taken along the line 4—4 of FIG. 3.

Referring still to FIG. 3, the spacing of the horizontal electrical connector 80 and its receiving channel 78 and the two horizontally extending portions of the right angled electrical connectors 82 are spaced a distance less than the distance which the pairs of electrical connector pins 90 on the lamp-reflector assemblies are spaced and, accordingly, electrical contact between, the lamp pins 90 and the electrical connectors 82 in the back side of the lamp unit is achieved by rotating the lamp-reflector assemblies 48 to a suitable angular position such that the connector pins 90 of the lamp-reflector assembly 48 are in an orientation for electrical contact with the connectors 82 mounted in the lamp body 18. Each of the electrical pins 90 of the lamp reflector assemblies is welded to its associated electrical connector 82 to thereby provide a series circuit for the two lamps carried in the overall move light arrangement.

As best seen in FIG. 2, an end cap assembly 92 is provided to cover the T-shaped surface defined by the cooperating main body section and the mating support sections of the lamp receiving members and to cover also the back side of each of the lamp receiving members where the electrical connections are achieved. This end cap member comprises a substantially T-shaped section 94 configured to cover and cooperate with the T-shaped section described hereinabove in which the electrical connectors are carried and further includes a pair of somewhat rearwardly offset end caps 96 which are configured to be partially received in the smaller annular members 38 of the lamp receiving member 34 and having an outer larger diameter section 98 which rests upon the rearward facing end of the smaller annular member to thereby completely seal off the back end of the lamp receiving member 34. It should be noted that, as is best shown in FIG. 2, the rearwardly disposed annular members 38 have a portion 100 thereof adjacent the T-shaped electrical connector receiving surface which is cut away to permit passage of the electrical connectors from the T-shaped surface into the region adjacent the back side of the lamps 48. This cut away portion 100 of these annular members 38 is filled in or covered by an increased thickness portion of the offset configuration of the two circular lamp mounting assembly capping elements 96 of the end cap member 92.

Referring to FIGS. 2 and 3, there are provided for each of the lamp receiving members 34, a forwardly extending lamp guard extension member 102, each of which comprises an inner annular ring member 104 having a portion 106 thereof adapted to extend within the outer annular member 36 of the lamp receiving member 34 and further having a portion 106 larger in diameter than the inner diameter of the lamp receiving member to thereby limit the penetration of the inner ring member 104 of the lamp guard extension 102 into the outer annular member of the lamp receiving element. The lamp guard extension 102 further comprises a plurality of outwardly extending anddiverging rib elements 108 which terminate at their outer ends in an outer annular ring member 110 defining the outer end of the lamp guard extension 102. In the preferred embodiment, the lamp guard extension ribs are arranged to be in alignment with a corresponding rib 40 in the lamp receiving member 34 and to facilitate assembly of the lamp guard extension to the lamp receiving member, a key 112 and keyway 114 are provided on the lamp guard extension and lamp mounting member, respectively, to facilitate proper orientation thereof. The lamp guard extension is further provided with a circular transparent lens member 116 at its outermost end which is configured to snap fit into the outermost ring member 110 of the lamp guard extension. As is seen in FIG. 2, three outwardly extending tangs 118 are provided on each of the lens members 116 which are adapted to be received in complementary notches 119 within the outer ring 110 to retain the lens members in position, once inserted therein.

In assembly of the lamp assembly as hereinabove described, the end cap member 92 attached to the rear portion of the lamp assembly and the lamp guard extensions 102 also described hereinabove, are all ultrasonically welded to their respective mating surfaces following assembly of one to the other.

As noted hereinabove, the lamp assembly main body 18 is provided with a downwardly extending positioning member 25 at its front surface 24 thereof and further includes a pair of electrical contact elements or pins 86 extending downwardly adjacent the rearward end thereof. In addition to these elements, a thumb screw 120 is provided to positively attach the movie light 12 to the top of the movie camera 10 with which it is used. The thumb screw 120 is adapted to be received in the vertically extending circular channel 21 provided in the interior of the main body support member 18. The thumb screw 120 is provided with threads 122 along a substantial portion of its length and has approximately a quarter inch region 124 adjacent the upper end which is unthreaded. The thumb screw 120 is adapted to be threadably received by a series of four protuberances 124 spaced around the circumferance of the entrance to the circular channel 21 at the upper end of the main body 18. The protuberances 124 serve to form the equivalent of a single female thread which, following complete threading of the thumb screw 120 into the circular channel 21, will serve to prevent inadvertent falling of the thumb screw 120 from the channel. Such an arrangement permits the thumb screw 120 to move vertically upward about a quarter of an inch as the unthreaded portion is of a smaller diameter than the diameter defined by the four protuberances. This arrangement facilitates attachment of the lamp assembly 12 to the mating structure of the movie camera 10 with which it is used. Such mating structure 126 is shown diagrammatically in FIG. 5. Accordingly, when installing the movie light on the camera, the electrical connectors 86 and the downwardly extending forward projection 25 are inserted into their respective openings provided in the camera and at this point, the thumb screw 120 having contacted its threaded receptacle 128 in the camera is caused to move upwardly a distance such that it is clear of the camera contacting surface 20 of the main body 18 and, accordingly, the movie light is able to seat firmly upon the upper surface of the camera. At this time, the thumb screw 120 is turned, and is threadably received in the female threads provided in the upper surface of the camera in order to positively, but releasably, attach the movie light to the camera. The thumb screw at this time may also serve, as it is threaded into the camera, to cause internal changes in the camera to facilitate operation with movie lights as opposed to use in daylight. It may, for example, be used to displace a daylight filter from an electric eye or a lens assembly as the case may be.

Following positioning of the movie light upon the camera as described above, and with the thumb screw not engaged in the camera, a condition which could occur upon installation of the movie light on the camera or during removal of the light from the camera, it may be possible to inadvertently tip the movie light backwards on the camera. If such were to occur, it would be possible to damage the electrical connector pins 86 by bending them rather sharply, as they are positioned adjacent the rear end of the main body support. To preclude such possible damage to the electrical connector pins, a rearwardly extending element 130 is provided at the rear of the movie light. This extension element 130 serves to move the pivot point of the movie light 12 rearwardly of the electrical connector pins 86 to reduce the probbility of damage to the pins where such a tilting to occur. FIG. 6 illustrates diagrammatically, first the movie light main body 18 in operative position with the camera, and in phantom lines illustrate the movie light tipped rearwardly. It will be noted that while the pins 86 are somewhat out of alignment with the receiving hole 88 in the camera, the movement of the pivoting point 134 to the position rearwardly of the pins will permit a rather gradual withdraw of the pins 86 from the camera structure and, although they may bend somewhat, will virtually preclude the possibility of a sharp bend which could, if repeated more than once, result in a breaking of the pins 86.

Electrical power for energizing the high intensity lamps 136 is provided through the contact of the pins 86 with electrical connectors 140 carried in the openings 88 in the upper surface of the camera. The electrical connectors 140 in the camera are energized by connection through a lead 142 from the camera to a conventional source (not shown) of electrical power. A convenient manner of achieving such an arrangement is illustrated in copending U.S. patent application Ser. No. 790,885 of S. H. Perry, entitled "Movie Camera and Light Control System", and assigned to the assignee of the present invention.

In the preferred embodiment, each of the lamp reflector assemblies 48 has a high intensity lamp 136 which is rated at 85 watts nominal and 60 volts and wired in series. The reflectors 138 are of the dichroic type thereby permitting passage of heat radiation through the reflector 138 for dissipation through the rib elements 40 of the lamp receiving members 34, thereby resulting in a cool operating unit. Each of the elements comprising the assembled movie light 12 is preferably molded from a clear plastic material thereby further facilitating dissipation of heat from the movie light when in operation.

Accordingly, it will be appreciated that the movie light of the present invention comprises a compact, rugged, easily assembled unit capable of mounting directly onto the top of a movie camera and for producing the necessary illumination while maintaining a relatively safe, cool outer protective structure.

This invention may be practiced or embodied in still other ways without departing from the spirit and essential character thereof. The preferred embodiment described herein is therefore illustrative and not restrictive, the scope of the invention being indicated by the appended claims and all variations which come within the meaning of the claims are intended to be embraced therein.

What is claimed is:

1. A lamp accessory for a camera, said accessory comprising:
   a pair of lamp-reflector assemblies, each said assembly including a forwardly facing lamp, an open-ended forwardly facing reflector extending around said lamp and a pair of rearwardly extending substantially parallel electrical terminals spaced apart a given distance and having their other ends electrically coupled to said assembly lamp;
   a main body support including a base portion adapted to seat on a portion of the camera and a wall portion arranged to face rearwardly when said base portion is properly seated on the camera, said wall portion having a pair of spaced apart tracks formed thereon extending upwardly from said base portion and respectively turning in opposite directions intermediate said base portion and the end of said wall portion opposite said base portion and another track formed thereon and extending thereacross spaced from said pair of tracks intermediate said pair of tracks and said end of said wall portion;
   a pair of lamp receiving and positioning cup members respectively coupled to opposite sides of said main body support, each said lamp receiving member having heat dissipating openings formed therearound and mounting one of said lamp-reflector assemblies therein with said lamp's electrical terminals extending rearwardly beyond a plane extending through said main body support's wall portion;
   means for retaining each of said lamp-reflector assemblies in its respective said lamp receiving member;
   a first electrical connector seated in said another track and extending from a first said terminal of one of said lamps to a first said terminal of the other of said lamps;
   a second electrical connector seated in one of said pair of tracks and extending from the second said terminal of said one lamp to a point below said base portion of said main body support;
   a third electrical connector seated in the other of said pair of tracks and extending from the second said terminal of said other lamp to a point below said base portion of said main body support; and
   means cooperating with said lamp receiving members and said main body support for capping said electrical terminals of said lamps and said first, second and third electrical connectors.

2. The accessory of claim 1 wherein said retaining means includes a lamp guard extension engaging forward edge portions of its respective said lamp reflector and welded to its respective said lamp receiving member, said lamp guard extension including a lens mounted over and spaced from its respective said lamp and including heat dissipating openings formed therearound intermediate its said lens and its respective said lamp.

3. The accessor of claim 1 wherein each said lamp receiving member includes an electrical connector support member having a rearwardly disposed face with tracks formed therein constituting extensions of said main body support tracks, said lamp receiving member tracks serving to receive respective portions of said electrical connectors.

4. The accessory of claim 3 wherein said wall portion of said main body support is planar and said electrical connector support members of said lamp receiving members constitute planar extensions of said wall portion and further wherein said capping means includes a substantially "T" shaped planar portion engagingly overlying, and complementary to, said wall portion and said electrical connector supports and a pair of cup-shaped members connected at opposite ends of the top arm of said "T" shaped planar portion to respectively engage the rearwardly facing ends of said lamp receiving members to cap said lamp terminals.

5. The accessory of claim 1 wherein said main body support additionally includes a pair of side walls presenting substantially planar external faces, each said lamp receiving member includes a support member presenting a substantially planar external face and said main body support and said lamp receiving member supports include complementary means for effecting a snap-fit connection therebetween with said support members' external faces respectively seated against said external faces of said main body support's side walls.

6. The accessory of claim 5 wherein said lamp receiving members, said main body support and said capping means are each formed of a single integrally molded plastic member.

7. The accessory of claim 1 wherein said main body support additionally includes a projection spaced from said rearwardly facing wall and extending downwardly and substantially parallel to said portions of said second and third electrical connectors extending below said main body support space portion so as to be receivable in a complementary receptacle of the camera when said accessor is properly seated on the camera.

8. The accessory of claim 7 wherein said base portion of said main body support includes a projection extending a substantial distance rearwardly of said portions of said second and third electrical connectors to preclude accidental damage to said second and third electrical connectors when mounting said accessory on, and removing said accessory from, the camera.

9. The accessory of claim 7 additionally including a thumb screw mounted on said main body support so as to be manually accessible from above said accessory and to selectively extend intermediate said portions of said second and third electrical connectors and said downwardly extending projection of said main body support so as to be selectively engagable with a complementary screw receptacle of the camera to releasably lock said accessory on the camera.

10. The accessory of claim 1 wherein said other track on said main body support's wall portion is spaced above said pair of tracks a distance less than said given distance between said electrical terminals of each said lamp-reflector assembly and said electrical terminals of each said lamp-reflector assembly are disposed between and in contact with said first electrical connector and said second or third electrical connector associated therewith, the plane in which said terminals of each said pair of terminals lie being canted at an acute angle with respect to the direction in which said second and third connectors extend below said base portion of said main body support.

11. A lamp accessory for a camera of the type including an accessory support surface having located in sequence thereon an electrical connector receptacle having a pair of recesses adapted to receive a pair of spaced apart electrical connectors, a screw receptacle and elongated receptacle extending substantially parallel to the plane in which the pair of electrical connector recesses lie, said accessory including:

a main body support including a base portion adapted to seat on the support surface of the camera and a projection extending downwardly from said base portion and configured to snugly seat in the elongated receptacle of the camera;

at least one lamp-reflector assembly mounted on said main body support;

a pair of electrical connectors coupled to said lamp-reflector assembly and extending through said main body support to terminate at points below its said base portion to respectively snugly seat in the pair of recesses of the camera's electrical connector receptacle when the accessory is properly positioned on the camera with its said projection seated in the camera's elongated receptacle; and a thumb screw on said main body support so as to be manually accessible and to selectively extend intermediate the portions of said electrical connectors extending below said main body support's base portion and said projection of said main body support and so as to be selectively engagable with the camera's screw receptacle to releasably lock said accessory on the camera.

12. The accessory of claim 11 wherein said base portion of said main body support includes a projection, extending a substantial distance on the opposite side of the portions of said electrical connectors extending below said base portion from said thumb screw, to preclude accidental damage to said electrical connector portions when mounting said accessory on, and removing said accessory from, the camera.

13. A camera for use with a lamp accessory of the type comprising a main body support including a base portion, a projection extending downwardly from the base portion, at least one lamp reflector assembly mounted on the main body support, a pair of electrical connectors coupled to the lamp reflector assembly and extending through the main body support below its base portion, a thumb screw mounted on the main body support so as to be manually accessible and to selectively extend intermediate the electrical connector portions extending below the base portion and the main body support projection, said camera including:

an accessory support surface having located in sequence thereon an electrical connector receptacle having a pair of recesses adapted to respectively snugly receive the portions of the electrical connectors extending below the base portion of the accessory's main body support, a screw receptacle adapted to receive the accessory's thumb screw when the accessory is properly seated on said camera to releasably lock the accessory on said camera and a receptacle configured to snugly receive the projection of the accessory when the accessory is properly mounted on said camera.

14. In combination, a photographic camera and a lamp accessory for use therewith, said lamp accessory comprising a main body support including a base portion, having a projection extending downwardly thereof, at least one lamp reflector assembly mounted on said main body support, a pair of electrical connectors coupled to said lamp reflector assembly and extending through said main body support below said base portion, a thumb screw mounted on said main body support so as to be manually accessible and to selectively extend intermediate said electrical connector portions extending below said base portion and said main body support projection, said camera comprising;

an accessory support surface having located in sequence thereon an electrical connector receptacle having a pair of recesses adapted to respectively snugly receive the portions of said electrical connectors extending below said base portion of said accessory's main body support, a screw receptacle adapted to receive said accessory's thumb screw when said accessory is properly seated on said camera to releasably lock said accessory on said camera and a receptacle configured to snugly receive said projection of said accessory when said accessory is properly mounted on said camera.

* * * * *